D. JARVES.
GLASS FURNACE.
No. 4,783. Patented Oct. 3, 1846.
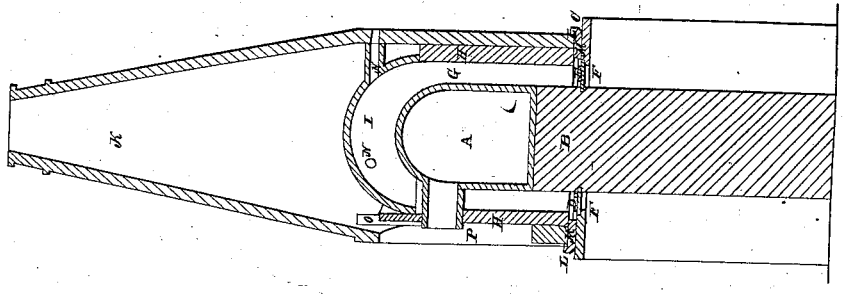
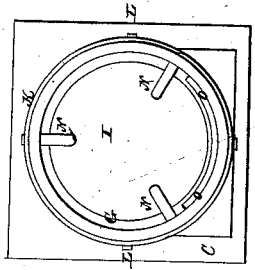 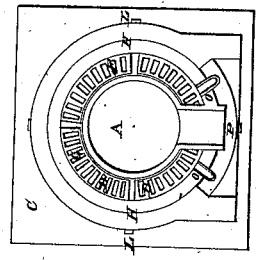
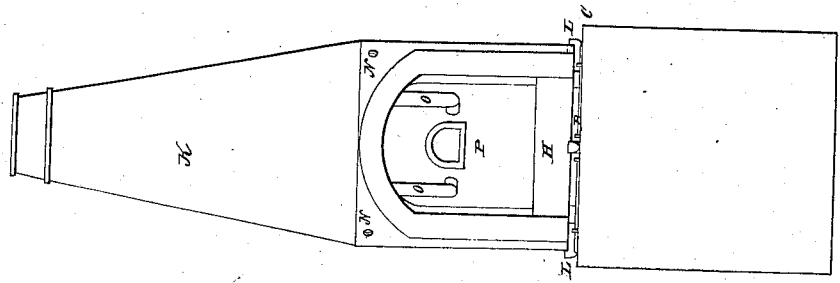

UNITED STATES PATENT OFFICE.

DEMING JARVES, OF BOSTON, MASSACHUSETTS.

GLASS-FURNACE.

Specification of Letters Patent No. 4,783, dated October 3, 1846.

*To all whom it may concern:*

Be it known that I, DEMING JARVES, of Boston, in the county of Suffolk and State of Massachusetts, have invented a new and useful Improvement in Glass-Furnaces, by which they may be operated by anthracite coal; and I do hereby declare that the nature of the same is fully set forth and represented in the following specification and accompanying drawings, letters, figures, and references thereof.

Figure 1 of said drawings denotes a front elevation of my improved furnace, Fig. 2 is a vertical and central section, taken through the mouth of the melting pot, Fig. 3 is a horizontal section taken through the said mouth of the said pot, and Fig. 4 is a horizontal section taken through the chimney, and just above the reverberating dome or arch, to be hereinafter described.

An ordinary glass furnace, as commonly constructed, consists of a series of melting pots, arranged within a circular or other proper shaped chamber, and as near the outer circumference thereof as they can be conveniently placed, and around a fireplace or pit, made in the central part of the floor or siege of said chamber. The flame of the fire made in the said pit is reverberated or thrown directly upon those parts of the melting pots which are nearest to the fireplace, while those parts which are farthest from the fire and which are immediately adjacent to the side wall of the chamber do not receive its influence to so great a degree. From this and various other causes it has been found either impossible or unprofitable to use anthracite coal in such a glass furnace. The importance of a furnace, in which this kind of fuel can be used to advantage, will be apparent to every glass manufacturer.

In the aforementioned drawings, A represents a melting pot of the ordinary kind. It is made to rest upon the top of a circular column or siege B made of fire brick and extended above the floor C of the glass house, as exhibited in the drawings. The said column may have its foundation in or below the cellar or cave. D, E exhibits the fire grate, which, in this case, is made to extend entirely around the siege, and to rest upon the floor C, and over suitable openings F, F, &c., made through the floor, and so as to permit ashes to fall into the cave or cellar. The melting pot and grate are inclosed within a circular chamber or fireplace G, made by a wall H, which terminates at top in a dome or reverberating arch I. The chimney K is built around and above the chamber and arch, as seen in the drawings. The bottom part of the wall H, rests upon blocks L, L, or other suitable contrivances, by which it is elevated a short distance above the floor C, in order to create openings M, M, &c., for the introduction of any suitable instrument for stirring the fire and causing the ashes to fall through the grates.

The fireplace or chamber G, is supplied with fuel through openings N, N, leading through the chimney and the reverberatory arch. The fireplace communicates with the chimney by one or more pipes or small chimneys O, O, which lead out of the chamber and into the chimney, as seen in the drawings. A part of the wall of the fire chamber, or that portion situated within the archway P, should be made so as to be readily removed, whenever it becomes necessary to insert a new melting pot.

The particular novel features of my improvement, consists in the manner in which the fire is disposed and made to act equally upon the sides and top part of the melting pot, the fuel chamber or fireplace being a circular chamber or space extending entirely around and below the siege of the melting pot; whereas, in common glass furnaces it is arranged at some distance from the fire pot, the flame from it being reverberated or thrown against that part of the pot nearest to it. It is very desirable that the exterior surface of the pot should be equally exposed to the action of the heat, otherwise, changes of temperature, sufficient to crack the pot, are likely to occur.

By my improved mode of making the furnace, the flame from the fireplace is made to completely encircle the melting pot. The depth of the chamber around the firepot, together with the position of the tease holes or passages N, N, enable me to fill the said chamber almost to the top with coal. Thus I cam embed, as it were the whole melting pot in a mass of coal, in combustion, and, by so doing, use the anthracite coal to great advantage.

What I claim, as my invention or improvement, is,

Extending the fireplace and flame chamber, entirely around, and so as to encompass the melting pot, in the manner substantially as above described, instead of placing the fireplace entirely on one side of the pot, as is the custom in ordinary glass furnaces.

In testimony whereof, I have hereto set my signature, this thirtieth day of May A. D. 1846.

DEMING JARVES.

Witnesses:
R. H. Eddy,
Caleb Eddy.